(12) United States Patent
Van Buuren et al.

(10) Patent No.: US 12,041,892 B2
(45) Date of Patent: *Jul. 23, 2024

(54) HYDROPONIC PLANTER

(71) Applicant: EDEN GREEN GLOBAL TECHNOLOGIES LIMITED, Dublin (IE)

(72) Inventors: Eugene Van Buuren, Pretoria (ZA); Jacques Van Buuren, Pretoria (ZA); Jan Ehlers, Centurion (ZA)

(73) Assignee: Eden Green Global Technologies Limited, Dublin (IE)

( * ) Notice: Subject to any disclaimer, the term of this patent is extended or adjusted under 35 U.S.C. 154(b) by 434 days.

This patent is subject to a terminal disclaimer.

(21) Appl. No.: 17/184,972

(22) Filed: Feb. 25, 2021

(65) Prior Publication Data

US 2021/0267149 A1 Sep. 2, 2021

Related U.S. Application Data

(63) Continuation of application No. 15/564,885, filed as application No. PCT/IB2016/052043 on Apr. 11, 2016, now Pat. No. 10,932,425.

(30) Foreign Application Priority Data

Apr. 10, 2015 (ZA) .................................. 2015/02400

(51) Int. Cl.
*A01G 31/06* (2006.01)
*A01G 9/02* (2018.01)

(52) U.S. Cl.
CPC ............. *A01G 31/06* (2013.01); *A01G 9/022* (2013.01); *A01G 9/023* (2013.01); *Y02P 60/21* (2015.11)

(58) Field of Classification Search
CPC ........ A01G 31/06; A01G 9/022; A01G 9/023; A01G 9/028
See application file for complete search history.

(56) References Cited

U.S. PATENT DOCUMENTS

| 3,432,965 A | 3/1969 | Smith et al. |
| 3,483,656 A | 12/1969 | Baumann |

(Continued)

FOREIGN PATENT DOCUMENTS

| CA | 2488178 | 2/2006 |
| CN | 1287774 | 3/2001 |

(Continued)

OTHER PUBLICATIONS

Office action issued in Corresponding Indian Application No. 201717039838, dated Jan. 27, 2021.

(Continued)

*Primary Examiner* — Monica L Perry
(74) *Attorney, Agent, or Firm* — Norton Rose Fulbright US LLP

(57) ABSTRACT

The invention relates to a planter forming part of a hydroponic system. The planter includes a longitudinal body defining at least two longitudinally extending liquid channels and at least two plant holders defined in the body, the plant holders spaced on the outer circumference of the longitudinal body, each one of the at least two plant holders in fluid flow communication with one of the at least two longitudinally extending liquid channels.

20 Claims, 7 Drawing Sheets

(56) References Cited

U.S. PATENT DOCUMENTS

| | | | |
|---|---|---|---|
| 3,660,933 A | 5/1972 | Wong, Jr. |
| 4,033,072 A | 7/1977 | Kobayashi et al. |
| 4,059,922 A | 11/1977 | DiGiancinto |
| 4,310,990 A | 1/1982 | Payne |
| 4,389,813 A | 6/1983 | Jaques et al. |
| 4,513,533 A | 4/1985 | Gething et al. |
| 5,276,997 A | 1/1994 | Swearengin |
| 5,385,590 A | 1/1995 | Sledge |
| 5,502,923 A | 4/1996 | Bradshaw |
| 5,533,302 A | 7/1996 | Lynch et al. |
| 5,724,768 A | 3/1998 | Ammann, Jr. |
| 6,065,245 A | 5/2000 | Seawright |
| 6,389,751 B1 | 5/2002 | Wang |
| 6,470,625 B1 | 10/2002 | Byun |
| 6,502,350 B1 | 1/2003 | Dick |
| 6,840,008 B1 | 1/2005 | Bullock et al. |
| 7,055,282 B2 | 6/2006 | Bryan, III |
| 7,069,691 B2 | 7/2006 | Brooke et al. |
| 7,171,782 B2 | 2/2007 | Felknor et al. |
| 8,776,433 B2 | 7/2014 | Huang et al. |
| 9,622,427 B2 | 4/2017 | Wagner |
| D785,497 S | 5/2017 | Storey |
| D795,129 S | 8/2017 | Dillard |
| D796,378 S | 9/2017 | Storey |
| 9,850,658 B2 | 12/2017 | Alcala Ordaz |
| 10,080,336 B2 | 9/2018 | Higgins |
| 2002/0005013 A1 | 1/2002 | Taylor |
| 2003/0089037 A1 | 5/2003 | Ware |
| 2006/0032128 A1 | 2/2006 | Morris |
| 2007/0144069 A1 | 6/2007 | Gottlieb |
| 2010/0132255 A1 | 6/2010 | Webber |
| 2010/0146854 A1 | 6/2010 | Cannon |
| 2011/0067301 A1 | 3/2011 | DeMitchell et al. |
| 2012/0167460 A1 | 7/2012 | Omidi |
| 2012/0279126 A1 | 11/2012 | Simmons |
| 2012/0291349 A1 | 11/2012 | Teng |
| 2013/0118074 A1 | 5/2013 | Fulbrook |
| 2014/0083007 A1 | 3/2014 | Galvin |
| 2015/0000189 A1 | 1/2015 | Greis-Avnon |
| 2015/0223418 A1 | 8/2015 | Collins et al. |
| 2015/0296726 A1 | 10/2015 | Higgins |
| 2015/0300011 A1* | 10/2015 | Lopez Otamendi .. E04B 2/8629 52/27 |
| 2016/0050863 A1 | 2/2016 | Graber |
| 2016/0353674 A1 | 12/2016 | Keats |
| 2017/0105372 A1 | 4/2017 | Bryan |
| 2017/0202161 A1 | 7/2017 | Eckert |
| 2017/0339854 A1 | 11/2017 | Van der Merwe |
| 2017/0347545 A1 | 12/2017 | Van der Merwe |
| 2018/0001447 A1 | 1/2018 | Lam et al. |
| 2018/0098516 A1 | 4/2018 | Van Buuren et al. |

FOREIGN PATENT DOCUMENTS

| | | |
|---|---|---|
| CN | 104206199 | 12/2014 |
| EP | 3261431 | 1/2018 |
| EP | 3264883 | 1/2018 |
| JP | S 52157437 | 11/1977 |
| JP | S 52163538 | 12/1977 |
| JP | H01-003540 | 1/1989 |
| JP | H01-104117 | 4/1989 |
| JP | H 01112653 | 7/1989 |
| JP | H05-276997 | 10/1993 |
| JP | H06-005549 | 1/1994 |
| JP | 2639130 | 8/1997 |
| JP | 2000217449 | 8/2000 |
| JP | 2001095385 | 4/2001 |
| JP | 2004-154084 | 6/2004 |
| JP | 2016-214194 | 12/2016 |
| JP | A 2018-513695 | 5/2018 |
| TW | 492607 | 1/2015 |
| WO | WO 2014/084702 | 6/2014 |
| WO | WO 2016/162856 | 10/2016 |

OTHER PUBLICATIONS

Examination issued in Corresponding European Application No. 16717710.4, dated Jun. 24, 2021.
Examination Report issued in Corresponding Malaysian Application No. PI 2017703810, dated Jun. 1, 2021 (English translation provided).
Office Action issued in Corresponding Brazilian Application No. BR 11 2017 021849-6, dated May 21, 2021 (English translation provided).
International Preliminary Report on Patentability issued in Corresponding PCT application PCT/IB2019/055702, dated Sep. 17, 2020.
International Search Report and Written Opinion issued in PCT Application No. PCT/IB2016/052043, issued Sep. 8, 2016.
International Preliminary Report on Patentability issued in PCT Application No. PCT/IB2016/052043, issued Oct. 10, 2017.
Search Report and Written Opinion issued in Singapore Application No. 11201708315S, issued Aug. 24, 2018.
International Preliminary Report on Patentability issued in Corresponding PCT application PCT/I82019/055702, dated Sep. 17, 2020.
International Search Report and Written Opinion Issued in Corresponding PCT Patent Application No. PCT/IB2019/055702, dated Oct. 23, 2019.
Office Action issued in Corresponding Brazilian Application No. BR 12 2019 027782.6, dated May 26, 2021 (English translation provided).
Office Action Issued in Corresponding Chinese Patent Application No. 201680033504.0, dated Nov. 28, 2019.
Office Action Issued in Corresponding European Patent Application No. EP16717710.4, dated Sep. 17, 2020.
Office Action Issued in Corresponding Japanese Patent Application No. 2018-503838, dated Feb. 27, 2020. (Machine Translation in English).
Office Action issued in Corresponding Singapore Application 11201708315S, dated May 14, 2021.
Written Opinion and Search Report in corresponding Singapore Application No. 11202100086V, dated Sep. 20, 2022.
Office Action issued in corresponding Japanese Patent Application No. 2021-523118, dated Sep. 4, 2023. (English Translation Provided).

* cited by examiner

HYDROPONIC PLANTER

CROSS-REFERENCE TO RELATED APPLICATIONS

This application is a Continuation of U.S. patent application Ser. No. 15/564,885, entitled "HYDROPONICS," filed on Oct. 6, 2017, which is a U.S. National Stage filing under 35 U.S.C. § 371 of International Application No. PCT/IB2016/052043 entitled "HYDROPONICS," filed on Apr. 11, 2016, which claims the benefit of South African Provisional Patent Application No. 2015/02400 entitled "HYDROPONICS," filed Apr. 10, 2015, the contents of each of which are incorporated by reference herein in their entirety.

FIELD OF INVENTION

This invention relates to hydroponics. In particular the invention relates to a planter, a planter tower and a hydroponic greenhouse

BACKGROUND OF THE INVENTION

The inventors are aware of hydroponic systems and arrangements. In particular, the inventors filed an earlier South African Patent application number 2014/02082.

Existing planters are prone to plants growing into each other and getting attached to each other in the planter, which make the harvesting of plants from the planter cumbersome.

Furthermore, the present invention has the object of improving planting density without compromising growth.

SUMMARY OF THE INVENTION

According to one aspect of the invention, there is provided a planter which includes a longitudinal body defining at least two longitudinally extending liquid channels; and at least two plant holders defined in the body, the plant holders spaced on the outer circumference of the longitudinal body, each one of the at least two plant holders in fluid flow communication with one of the at least two longitudinally extending liquid channels.

The longitudinal body may include a single longitudinal conduit which is internally divided to define the at least two longitudinally extending liquid channels.

Each planter holder may define a holder mouth into which plants are receivable. In particular the holder mouth may be shaped as an applanated cylindrical ellipse, circle or the like.

In one embodiment, the at least two plant holders may be located on opposed sides of the longitudinal body. In particular, the at least two plant holders may be alternatively spaced on opposed sides over the length of the longitudinal body.

Each of the plant holders may be in fluid flow communication with a different one of the longitudinally extending liquid channels.

The longitudinal body may include connecting formations at the ends of the longitudinal body.

The connecting formations may be shaped and dimensioned to fit into corresponding connection formations of corresponding planters.

The operative lower end of the longitudinal body of the planter may have a connection formation for fitting into a corresponding connection formation on an operative upper end of a longitudinal body of a corresponding planter installed below the former planter, and the operative upper end of the longitudinal body of the planter may have a connection formation for fitting into a corresponding connection formation on an operative lower end of a longitudinal body of a corresponding planter installed above the former planter.

In one embodiment the connecting formations may be in the form of socket and spigot formations shaped and dimensioned to fit into respective spigot and socket formations of corresponding planters.

The operative lower end of the longitudinal body of the planter may have a spigot formation, for fitting into a socket formation on an operative upper end of a longitudinal body of a corresponding planter installed below the former planter and the operative upper end of the longitudinal body of the planter may have a socket formation for receiving a spigot formation on an operative lower end of a longitudinal body of a corresponding planter installed above the former planter.

In an opposed example, the operative lower end of the longitudinal body of the planter may have socket formation, for receiving a spigot formation on an operative upper end of a longitudinal body of a corresponding planter installed below the former planter and the operative upper end of the longitudinal body of the planter may have a spigot formation for fitting into a socket formation on an operative lower end of a longitudinal body of a corresponding planter installed above the former planter.

Each plant holder may include an inlet opening and an outlet opening, which is in flow communication with its corresponding liquid channel. In particular the inlet opening may be located above the outlet opening to permit gravitational liquid flow into the plant holder through the inlet opening and liquid flow from the plant holder through the outlet opening.

The planter may include at least one longitudinally extending gas channel, the gas channel having gas outlets spaced along its length. The gas outlets may open to the outside of the planter body. The gas outlets may be in the form of nozzles.

The connecting formations may be shaped and dimensioned to connect adjacent planter bodies together. The connecting formations may include liquid channel connecting formations for connecting the liquid channels of adjacent planter bodies together. The connecting formations may include gas channel connecting formations for connecting the gas channels of adjacent planter bodies together.

The planter may include an external attachment formation proximate the plant holder mouth for attaching plant supports. In particular, the attachment formation may be located below the plant holder mouth and may receive various types of plant supports, such as a creeper trellis and the like. In this embodiment, the creeper trellis may be arranged to support a creeper plant, planted in the plant holder when it grows from the plant holder mouth.

The external attachment formation may further be supportive of lighting means, proximate the plant leaves for enhancing lighting onto the plant and subsequent plant growth. The lighting means may be in the form of light emitting diodes (LED's) operable to emit a specific frequency of light.

The planter may further include planting inserts shaped and dimensioned to fit into mouths of the at least two plant holders.

The planting inserts may be selected from any one or more of: a seedling tray, a planting tray, a seeding clip and the like.

The seedling tray may be in the form of a cylindrical body, shaped to the shape of the plant holder. The seedling tray may have a depth of about 43 mm. The seedling tray may include an inlet opening indexed with the inlet opening of the plant holder. The seedling tray may include a planar base cut in sections to provide drainage slits. The drainage slits may be less than 0.5 mm in width to permit liquid drainage without flushing seedlings from the seedling tray.

The planting tray may be in the form of a cylindrical body shaped to the shape of the plant holder. The planting tray may have a depth of about 117 mm. The planting tray may include an inlet opening indexed with the inlet opening of the plant holder. The planting tray may include a planar base cut in sections to provide drainage slits. A portion of the planting tray sidewall may also include drainage slits. The portion of the sidewall may be slightly tapered towards the base. The drainage slits may be less than 0.5 mm in width to permit liquid drainage without flushing seedlings from the seedling tray.

The seeding clip may have a planar body for closing the planter mouth and provided with a downwardly projecting plate having a slot shaped to engage the stem of a plant.

According to another aspect of the invention, there is provided a planter tower, which includes a plurality of planters as described, connected together to form an elongate upright planter with plant holders extending from the sides of the planter tower.

The planter tower may include between eight and sixteen planters connected together.

The planter tower may include at least one end member, shaped and dimensioned to connect onto an end the plurality of planters connected together.

Specifically the planter tower may include two end members, a top end member for connecting to the top end of the plurality of planters and a bottom end member for connecting to the bottom end of the plurality of planters.

The at least one end member may be shaped to fit onto an end of a longitudinal body of a planter, socket and spigot fashion.

The at least one end member may include dual liquid conduits indexed to match the longitudinally extending liquid channels.

The at least one end member may include a gas conduit indexed to match a gas channel extending through the planters.

The at least one end member may include a body with two sides, one of which is provided with a socket formation and one of which is provided with a spigot formation for fitting onto matched spigot and socket formations of the ends of the longitudinal body.

The top end member may be in the form of an intake closure attached at a top end of a plurality of inter-connected planters for directing liquid into the two longitudinally extending liquid channels and for directing gas into the at least one longitudinally extending gas channel.

The bottom end member may be in the form of an outlet closure attached at a bottom end of a plurality of inter-connected planters for directing liquid from the two longitudinally extending liquid channels and for directing gas from the at least one longitudinally extending gas channel.

The at least one end member may include a catchment tray, for receiving any overflow liquid.

The liquid channels may extend over the length of the interconnected planters.

Each planter in the planter tower may include a gas channel, the gas channel extends over the length of the inter-connected planters.

According to another aspect of the invention, there is provided a hydroponic greenhouse, which includes an array of planter towers, the planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers; a liquid circulation system, connected to the liquid supply lines and the liquid collection lines; a gas circulation system, connected to the gas supply lines and the gas collection lines.

In an embodiment where the gas outlets, described above, are directed to the outsides of the planter bodies, the gas outlets may be directed at plants in an adjacent planter tower, advantageously to provide an adequate exchange of gas on the leaves of an adjacent plant.

The greenhouse may include a partially closed enclosure, which may be provided with any one or more of air conditioners, high pressure fans, dampers, coiled coolers for recirculation of the liquid or gas from the liquid collection lines to the liquid supply lines or alternatively gas supply lines, geothermal heater/coolers, heat pumps, humidity controllers, infra-red controllers, and the like.

The greenhouse may be provided with a nutrient supply dosing pump connected to the liquid circulation system for dosing nutrients into the liquid circulation system.

The greenhouse may further include a filtering arrangement connected to the liquid circulation system for filtering the liquid in the liquid circulation system.

The invention will now be described by way of a non-limiting example only, with reference to the following drawing.

DRAWINGS

EMBODIMENT OF THE INVENTION

Figure 1B:
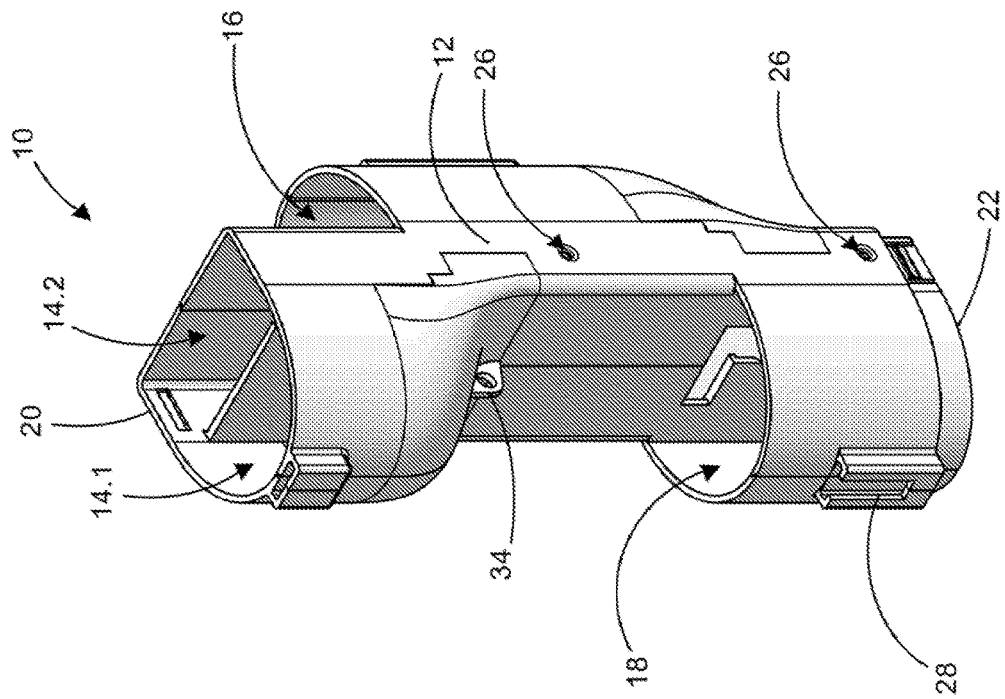
FIGS. 1a and 1b show three-dimensional views of a planter in accordance with one aspect of the invention.
Figure 1A:
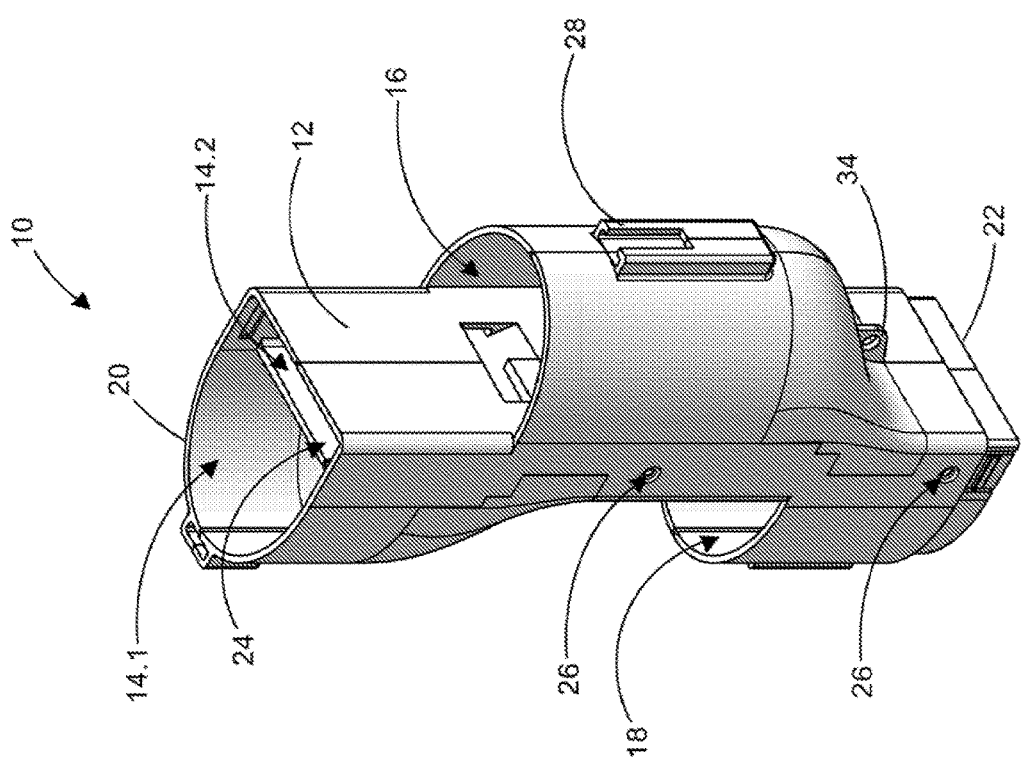
Figures 2A, 2B:
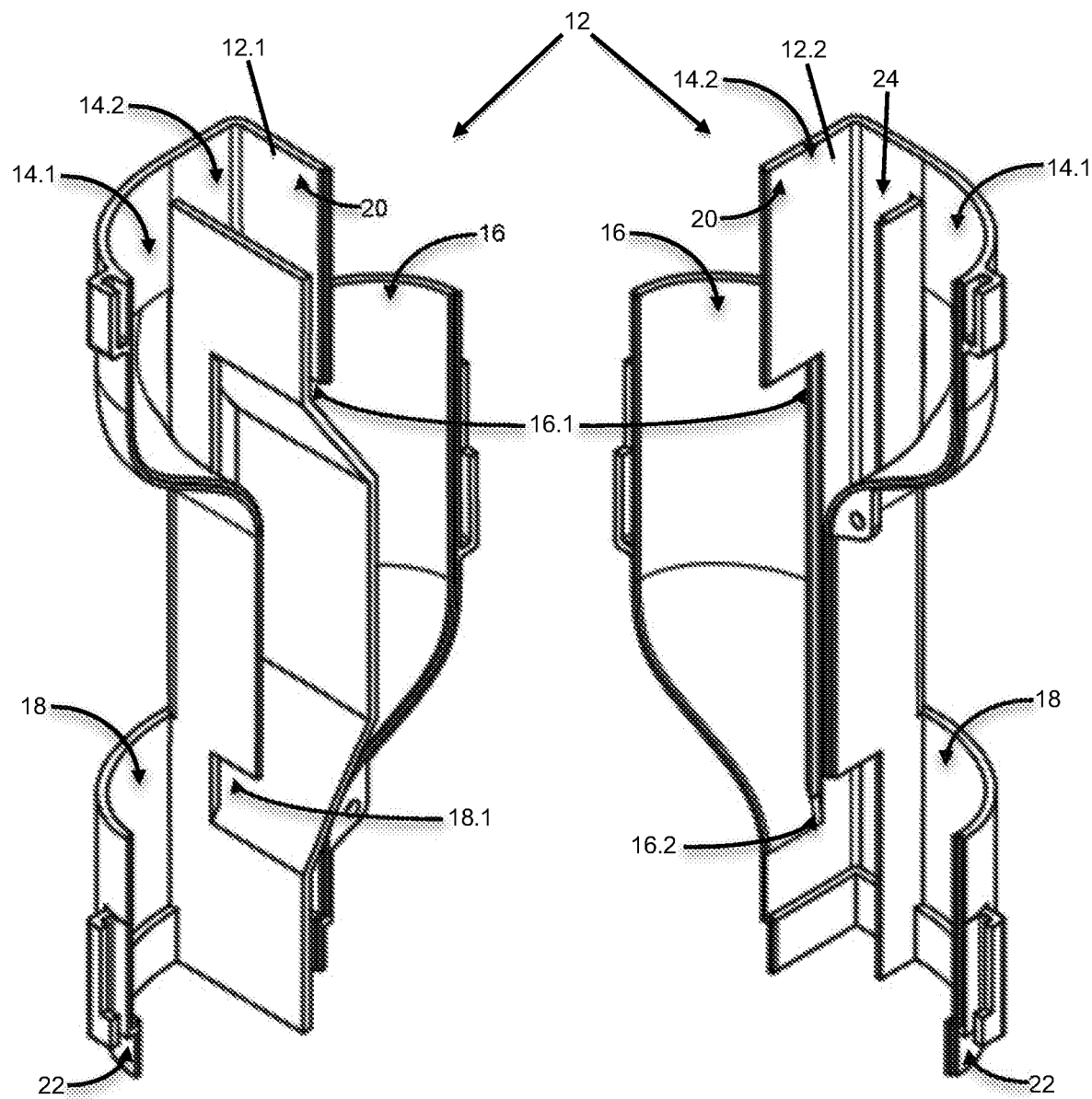
FIGS. 2a and 2b show two halves of the planter of FIG. 1.

In FIG. 1 a planter 10, in accordance with one aspect of the invention, is shown. The planter 10 has a longitudinal body 12, in two halves 12.1 and 12.2, as best shown in FIGS. 2a and 2b.

The longitudinal body 12 defines two longitudinally extending liquid channels 14.1 and 14.2 as shown in FIGS. 1 and 2.

The planter 10 includes two plant holders 16, 18 defined on the outer circumference of the longitudinal body. As can be seen in FIG. 2, the two plant holders 16, 18 have openings 16.1, 18.1 defining liquid inlets to the plant holders and 16.2, 18.2 defining liquid outlets from the plant holders.

As can be seen in FIGS. 1 and 2, the plant holders 16, 18 have holder mouths in the form of applanated cylindrical ellipses.

As can be seen in FIGS. 1 and 2, the two plant holders 16, 18 are alternatively spaced on opposed sides of the longitudinal body.

Figure 3:
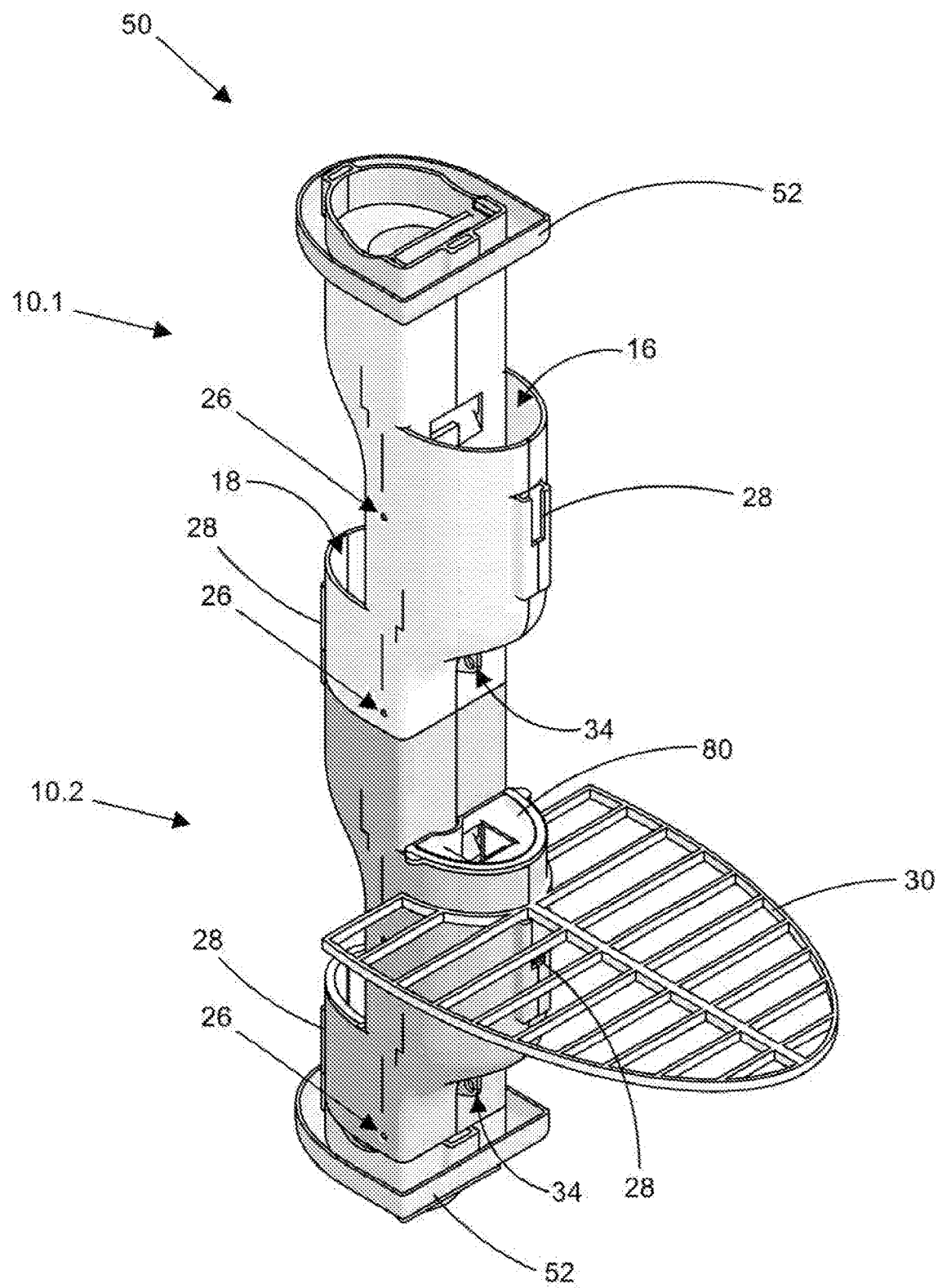
FIG. 3 shows a planter tower comprising assembled planters of FIG. 1.

In FIGS. 1 and 2, it can be seen that the longitudinal body has connecting formations 20, 22 in the form of socket and spigot formations at the ends of the longitudinal body 12. As can be seen in FIG. 3, the connecting formations are shaped and dimensioned to fit into respective spigot and socket formations of corresponding planters.

Importantly the operative lower end of the longitudinal body 12 of the planter 10 has a spigot formation 22, for fitting into a socket formation 20 on an operative upper end of a longitudinal body 12 of a corresponding planter 10 installed below the former planter.

As can be seen in FIG. 2, each plant holder 16, 18 has an inlet opening 16.1, 18.1 and an outlet opening 16.2, 18.2, respectively, which forms part of its corresponding liquid channel 14.2 and 14.1, respectively. As can be seen, the inlet openings 16.1, 18.1 are located above the outlet openings 16.2, 18.2 to permit liquid to flow into the plant holders 16, 18 through the inlet openings 16.1, 18.1 and from the plant holder through the outlet opening 16.2, 18.2.

As can be seen in FIG. 2, each plant holder 18 comprises two halves, which defines a complete plant holder, when connected to each other.

Figure 9:
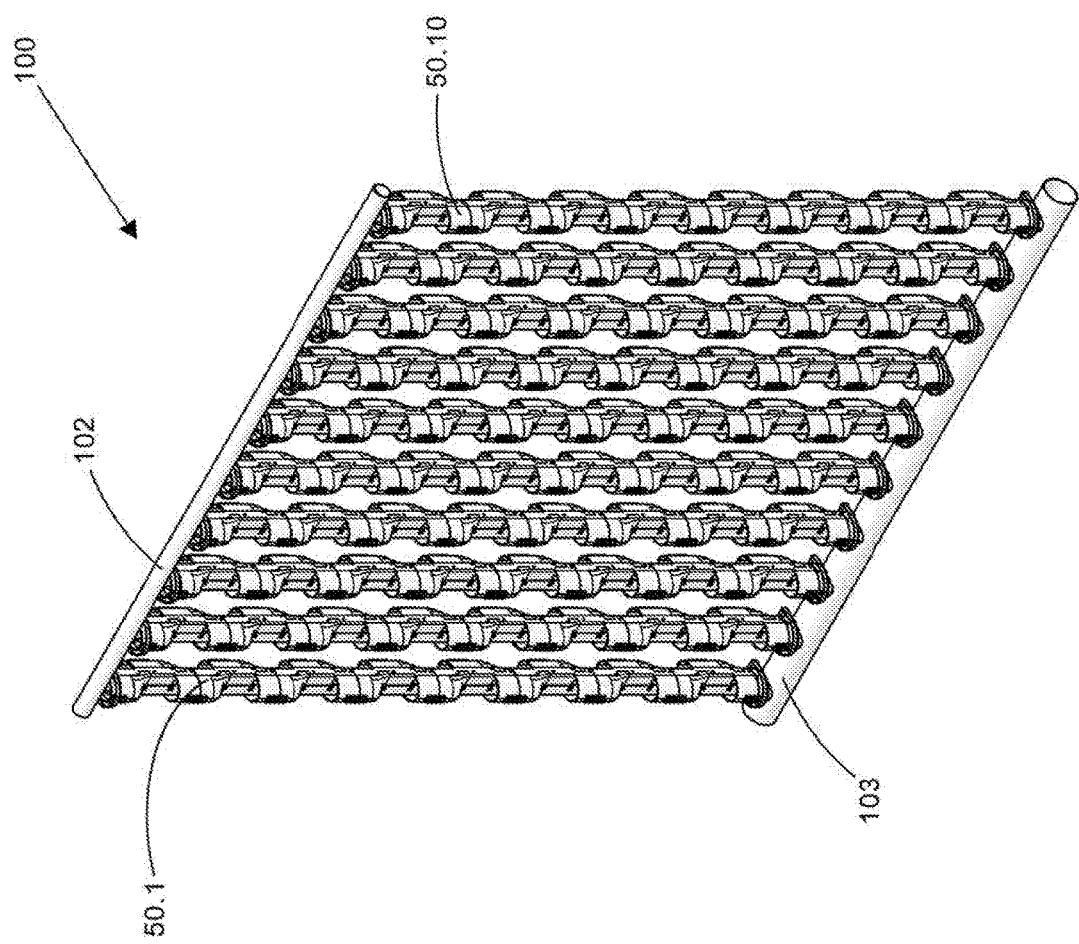
FIG. 9 shows a hydroponic greenhouse in accordance with a further aspect of the invention.

The planter 10 further includes a longitudinally extending gas channel 24. The gas channel 24 has outlets spaced along its length. In particular, the gas channel 24 has outlets 26 that open to the outside of the planter body 12 (see FIG. 3). The gas outlets 26 are in the form of nozzles, when the planters are assembled in an array as shown in FIG. 9, the nozzles are directed at plants in adjacent planter towers, to ensure adequate gas exchange on the leaves of those plants.

Figure 7:
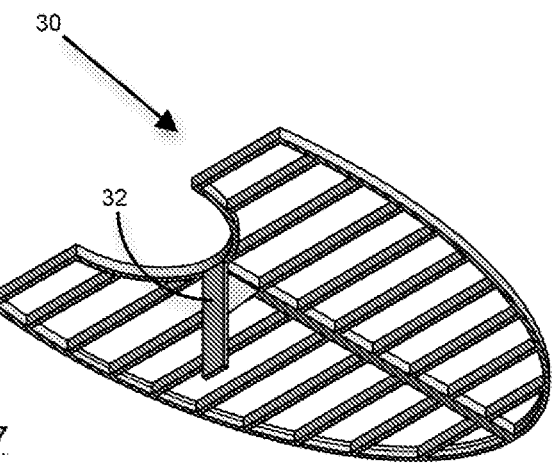
FIG. 7 shows a creeper trellis of a planter.

As can be seen in FIG. 1, the planter has an external attachment formation 28 proximate the plant holder mouth for attaching plant supports. One example of such a plant support is a plant trellis 30, shown in FIG. 7, which has a corresponding attachment formation 32, which can fit into the attachment formation 28, spigot and socket fashion. The creeper trellis 30 is arranged to support a creeper plant (not shown), planted in the plant holder when it grows from the plant holder mouth 16, 18.

The planter 10 also has external attachment formations in the form of apertures 34, for holding wire, line or cables that can provide additional structural strength to the planter assembly 50 or to provide a structure onto which creepers can grow.

Figure 5:
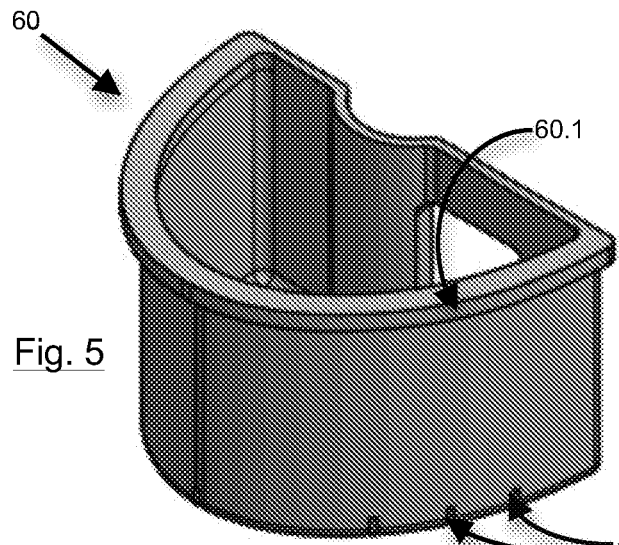
FIG. 5 shows a seedling tray of a planter.
Figure 6:
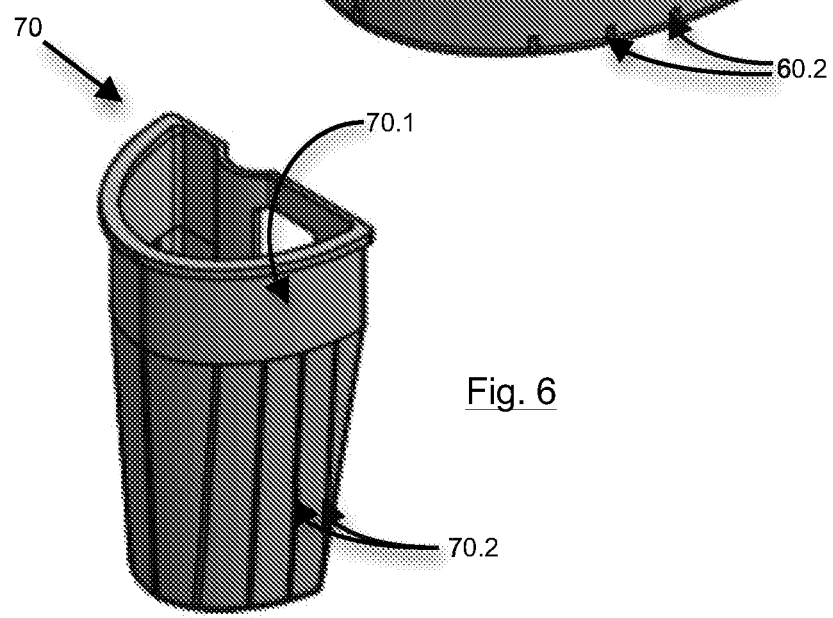
FIG. 6 shows a planting tray of a planter.
Figure 8:
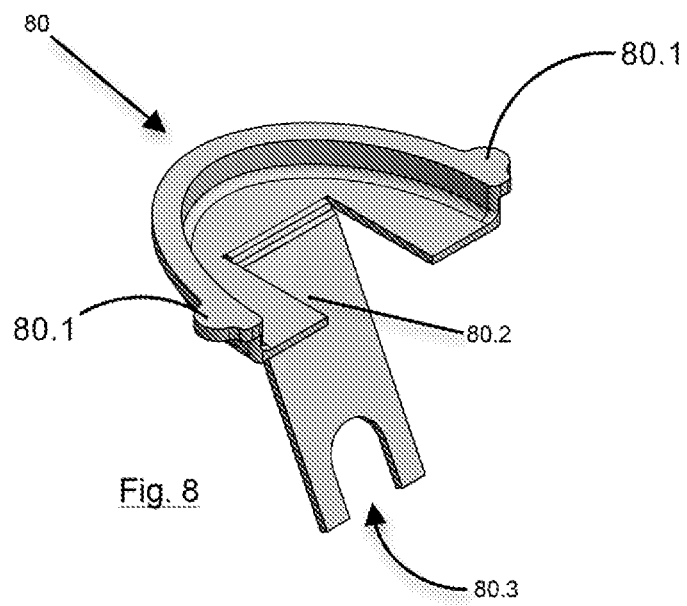
FIG. 8 shows a seeding clip of a planter arrangement.

Each planter 10 also includes planting inserts (as shown in FIGS. 5, 6 and 8) shaped and dimensioned to fit onto mouths of the plant holders 16, 18. The planting inserts are selected from: a seedling tray, a planting tray and a seedling clip. The planting inserts may be selected based on its suitability for a specific plant.

In FIG. 5 a seedling tray 60 is shown, which is shaped and dimensioned to fit into a mouth of a plant holder 16, 18. The seedling tray 60 has a depth of about 43 mm. The seedling tray 60 has an inlet opening 60.1 indexed with the inlet openings 16.1, 18.1 of the plant holder. The seedling tray 60 has a planar base cut in sections to provide drainage slits 60.2. The drainage slits 60.2 are less than 0.5 mm in width to permit liquid drainage without flushing seedlings from the seedling tray 60.

In FIG. 6 a planting tray 70 is shown, which is shaped and dimensioned to fit into a mouth of a plant holder 16, 18. The planting tray 70 has a depth of about 117 mm and is in the form of a cylindrical body shaped to the shape of the plant holder 16, 18. The planting tray 70 includes an inlet opening 70.1 indexed with the inlet openings of the plant holder 16.1, 18.1. The planting tray 70 has a planar base cut in sections to provide drainage slits. A portion of the planting tray sidewall also has drainage slits 70.2. The portion of the sidewall is slightly tapered towards the base. The drainage slits is less than 0.5 mm in width to permit liquid drainage without flushing seedlings from the seedling tray 70.

In FIG. 8 a seeding clip 80 is shown. The seeding clip 80 is shaped to fit onto the mouth of a plant holder 16, 18. The seeding clip 80 has a planar body for closing the planter mouth and is provided with a downwardly projecting plate 80.2 and a slot 80.3 shaped to engage the stem of a plant. The seeding clip 80 further includes finger projections 80.1, which can be compressed towards each other for removing the seeding clip 8 from the mouth of the plant holder 16, 18.

FIG. 3 shows a planter tower 50 in accordance with a further aspect of the invention. In this example the planter tower 50 includes two planters 10.1, 10.2 as described, connected together to form an elongate upright planter, with plant holders 16, 18 extending from the sides of the planter tower 50 (It is to be appreciated that in a preferred embodiment a planter tower would include about eight planters connected together as shown in FIG. 9).

Figure 4A:
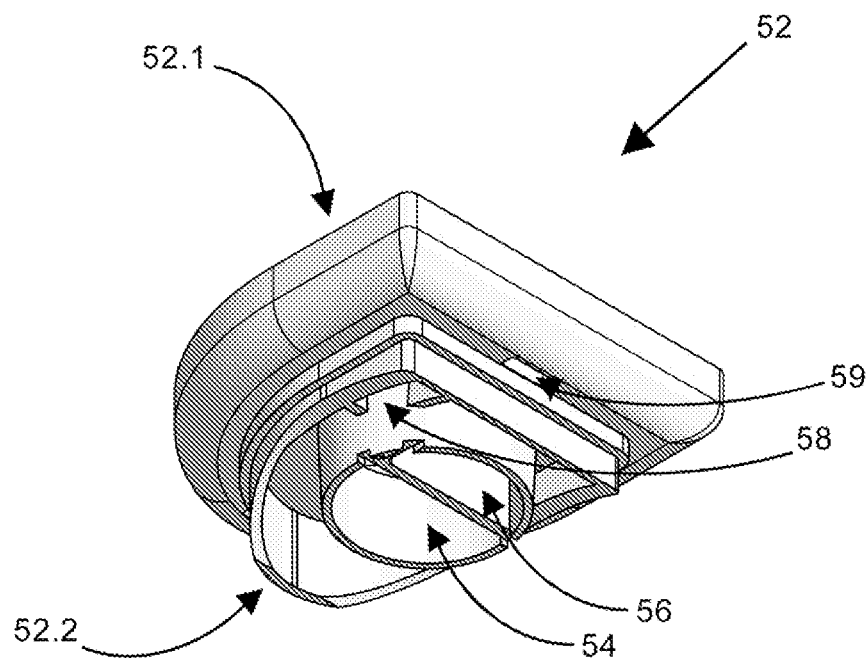
FIGS. 4a and 4b show three-dimensional views of an end member of a planter arrangement.
Figure 4B:
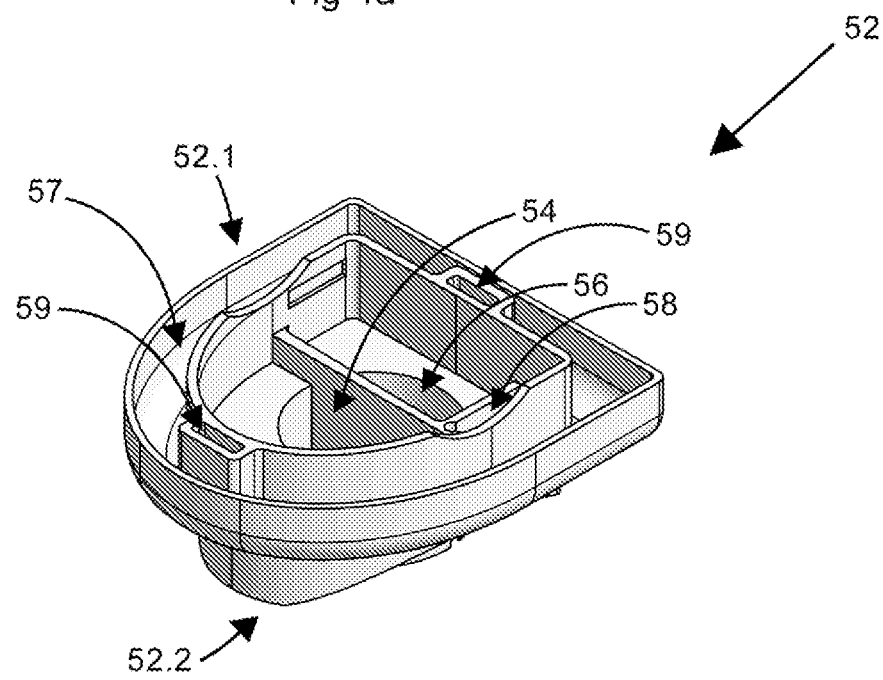

The planter tower 50 is provided with two end members 52, as best shown in FIG. 4, (not mounted in FIG. 4) shaped to fit socket and spigot fashion onto a top or bottom end of a longitudinal body 12 of a planter 10.

The end members 52 have dual liquid conduits 54, 56 indexed to match the longitudinally extending liquid channels 14.2, 14.1. The end members 52 also each has a gas conduit 58 indexed to match the gas channel 24 extending through the planters.

The end members 52 each has a body with two sides, an upper side which is provided with a socket formation 52.1 and a bottom side which is provided with a spigot formation 52.2 for fitting onto matched spigot 22 and socket 20 formations on the ends of the longitudinal body 12 of the planters 10. The upper and bottom sides further includes a recessed cradle formation for receiving a top liquid and gas supply line (as shown in FIG. 9) and a bottom liquid and gas collection line across the end members. In this example the upper cradle formation is dimensioned to fit a 50 mm to 65 mm pipe and the bottom cradle formation is dimensioned to fit a 110 mm to 160 mm pipe.

In this example the planter tower 50 includes a top end member 52 for connecting to the top end of the plurality of planters 10.1, 10.2 and a bottom end member 52 for connecting to the bottom end of the plurality of planters 10.1, 10.2. The top end member 52 and bottom end member 52 are identical in shape and dimension, but function as an intake closure 52 and outlet closure 52 respectively.

The intake closure 52 attached at a top end of a plurality of interconnected planters, being operable to direct liquid into the two longitudinally extending liquid channels 14.1, 14.2 and for directing gas into the longitudinally extending gas channel 24.

The outlet closure 52 attached at a bottom end of a plurality of interconnected planters, being operable to direct liquid out from the two longitudinally extending liquid channels 14.1, 14.2.

The liquid channels 14.1, 14.2 and gas channel 24 extend over the length of the inter-connected planters 10.

The bottom side of the end members 52 also includes a catchment tray 57 on the outer perimeter of the end members. When the end member 52 is used as a bottom end member, the catchment tray 57 is operable to receive overflow liquid from the planter tower 50.

As can be seen in FIG. 3, the plant holders 16, 18 which are alternatively spaced on opposed sides over the length of the of the planter tower 50, provide for maximum space and access to sunlight for the plants. Furthermore, with the roots growing downwardly, possibly into the liquid channels 14.1, 14.2, maximum provision is made for root growth, without interference from plants directly below or above any planter.

FIG. 9 shows a hydroponic greenhouse 100 in accordance with yet a further aspect of the invention. The hydroponic greenhouse 100 includes an array of planter towers as described. In this figure only one row of planter towers 50.1 to 50.10 are shown (for illustrative purposes), however in practice the hydroponic greenhouse includes a plurality of parallel spaced planter tower rows.

The rows being provided with a top liquid and gas supply line 102, connected via an intake closure 52 to a top of each of the planter towers 50. The rows are further provided with a bottom liquid and gas collection line 103, connected via an outlet closure 52 to a bottom of each of the planter towers 50.

The hydroponic greenhouse 100 includes a liquid circulation system (not shown), connected to the liquid supply lines 102 and the liquid collection lines 103 and a gas circulation system (not shown), connected to the gas supply lines 102 and the gas collection lines 103.

In this example the top liquid and gas supply line 102 includes a 50 mm to 65 mm diameter plastic outer pipe, onto which the top end members 52 of each planter tower 50 in the row is attached. The 50 mm to 65 mm diameter plastic outer pipe includes interspaced apertures through which liquid and gas is fed into the planter towers 50. The top end members (inlet closures) 52 are secured to the pipe via connectors. In this example the connectors are in the form of cable ties (not shown), which are threaded through connector apertures 59 on the end members 52.

In this example the bottom liquid and gas collection line 103 includes a 110 mm to 160 mm diameter plastic outer pipe, onto which the bottom end members (outlet closures) 52 of each planter tower 50 in the row is attached. The 110 mm to 160 mm diameter plastic outer pipe includes interspaced apertures through which liquid and gas is received from the planter towers 50. The bottom end members 52 are secured to the pipe via connectors. In this example the connectors are in the form of cable ties (not shown), which are threaded through connector apertures 59 on the end members 52.

The hydroponic greenhouse includes a partially closed enclosure (not shown), which is provided with any one or more of: air conditioners, high pressure fans, dampers, coiled coolers for recirculation of the liquid or gas from the liquid collection lines to the liquid supply lines or alternatively gas supply lines, geothermal heater/coolers, heat pumps, humidity controllers and infra-red controllers.

The hydroponic greenhouse is also provided with a nutrient supply dosing pump (not shown) connected to the liquid circulation system for dosing nutrients into the liquid circulation system.

The hydroponic greenhouse is further provided with a filtering arrangement (not shown) connected to the liquid circulation system for filtering the liquid in the liquid circulation system.

The inventors are of the opinion that the invention as described provides a new planter, a planter tower and a hydroponic greenhouse.

The invention claimed is:

1. A planter comprising:
a longitudinal body defining at least two liquid channels, the at least two liquid channels comprising:
a first liquid channel having a first channel inlet opening and a first channel outlet opening, a first flow path of the first liquid channel extends from the first channel inlet opening to the first channel outlet opening; and
a second liquid channel that is distinct from the first liquid channel; and
at least two plant holders defined in the longitudinal body and spaced apart on the longitudinal body,
where each of the at least two liquid channels are in fluid communication with a corresponding plant holder of the at least two plant holders,
where the longitudinal body includes a first portion and a second portion, and
where at least one planter holder of the at least two plant holders is formed when the first portion and the second portion are connected together.

2. The planter of claim 1, where the first portion and the second portion, when connected together, cooperate to define the first liquid channel and the second liquid channel.

3. The planter of claim 2, wherein the first portion and the second portion, when connected together, cooperate to define the at least two plant holders.

4. The planter of claim 1, in which each plant holder has a corresponding mouth, and in which the planter includes an external attachment formation associated with each plant holder for attaching a plant support, the external attachment formation is located below the plant holder mouth, and the plant support is in the form of a creeper trellis arranged to support a creeper plant, planted in the plant holder when it grows from the plant holder mouth.

5. The planter of claim 1, in which the planter includes planting inserts shaped and dimensioned to fit into mouths of the at least two plant holders, and in which the planting inserts are selected from any one or more of: a seedling tray, a planting tray and a seeding clip.

6. The planter of claim 1, where the longitudinal body includes a divider configured to divide at least a portion of a longitudinal conduit of the longitudinal body into the at least two liquid channels.

7. The planter of claim 1, further comprising:
at least one longitudinally extending gas channel, the at least one longitudinally extending gas channel having gas outlets between a first end of the longitudinal body and a second end of the longitudinal body.

8. The planter of claim 1, where:
the first liquid channel includes a first liquid channel portion that extends from a first end to a first inlet of a first plant holder of the at least two plant holders;
the second liquid channel includes a second liquid channel portion that extends from the first end to a second inlet of a second plant holder of the at least two plant holders;
the first liquid channel includes a third liquid channel portion that extends from a first outlet of the first plant holder toward a second end of the longitudinal body, the second end opposite the first end; and
the second liquid channel includes a fourth liquid channel portion that extends from a second outlet of the second plant holder toward the second end.

9. The planter of claim 8, where:
the third liquid channel portion extends from the first outlet of the first plant holder to the second end of the longitudinal body; and
the fourth liquid channel portion extends from the second outlet of the second plant holder to the second end of the longitudinal body.

10. The planter of claim 1, where:
each plant holder includes an inlet opening and an outlet opening;
each of the at least two plant holders includes a plant holder inlet opening located above a plant holder outlet opening to permit gravitational liquid flow into the plant holder through the plant holder inlet opening and liquid flow from the plant holder through the plant holder outlet opening; and
at least one of the at least two plant holders is in fluid flow communication with one of the at least two liquid channels via the plant holder inlet opening and plant holder outlet opening.

11. A planter tower comprising a plurality of planters coupled together to form an elongate upright planter with plant holders extending from sides of the planter tower, the plurality of planters comprising at least one planter as claimed in claim 1.

12. The plant tower of claim 11, where the at least two plant holders include at least three plant holders defined in the longitudinal body, each one of the at least three plant holders in fluid flow communication one of the at least two liquid channels.

13. The planter tower of claim 11, further comprising at least one end member shaped and dimensioned to connect onto an end of the plurality of planters connected together.

14. The planter tower of claim 13, where the at least one end member comprises:
a top end member attached at a top end of the plurality of planters connected together, the top end member configured to direct liquid toward the first liquid channel and the second liquid channel; or
a bottom end member attached at a bottom end of the plurality of planters connected together, the bottom end member configured to direct liquid from the first liquid channel and the second liquid channel.

15. A greenhouse comprising an array of planter towers, at least one of the plant towers including at least one planter as claimed in claim 1.

16. The greenhouse of claim 15, further comprising:
a liquid circulation system coupled to the first liquid channel and the second liquid channel; and
a nutrient supply dosing pump connected to the liquid circulation system and configured to provide nutrients into the liquid circulation system; or
a filter connected to the liquid circulation system and configured to filter a liquid of the liquid circulation system.

17. The planter of claim 1, further comprising:
a first connecting formation at a first end of the longitudinal body, and a second connecting formation at a second end of the longitudinal body, the second end opposite the first end.

18. A method comprising:
providing a planter comprising:
a longitudinal body defining at least two liquid channels, the at least two liquid channels comprising:
a first liquid channel having a first channel inlet opening and a first channel outlet opening, a first flow path of the first liquid channel extends from the first channel inlet opening to the first channel outlet opening; and
a second liquid channel that is distinct from the first liquid channel; and
at least two plant holders defined in the longitudinal body and spaced apart on the longitudinal body,
where each of the at least two liquid channels are in fluid communication with a corresponding plant holder of the at least two plant holders,
where the longitudinal body includes a first portion and a second portion, and
where at least one plant holder of the at least two plant holders is formed when the first portion and the second portion are connected together; and
providing a fluid via the first liquid channel, the second liquid channel, or a combination thereof.

19. The method of claim 18, further comprising:
coupling the first portion of the longitudinal body and the second portion of the longitudinal body to form the at least one plant holder of the at least two plant holders;
coupling the planter to a second planter to form a first planter tower; or
a combination thereof.

20. The method of claim 19, further comprising:
coupling the planter to a second planter to form a first planter tower; and
coupling the first planter tower to a second planter tower to form an array of planter towers.

* * * * *